Dec. 30, 1941.  C. J. CONN  2,267,789
APPARATUS FOR FREEZING FOOD PRODUCTS
Filed March 15, 1939
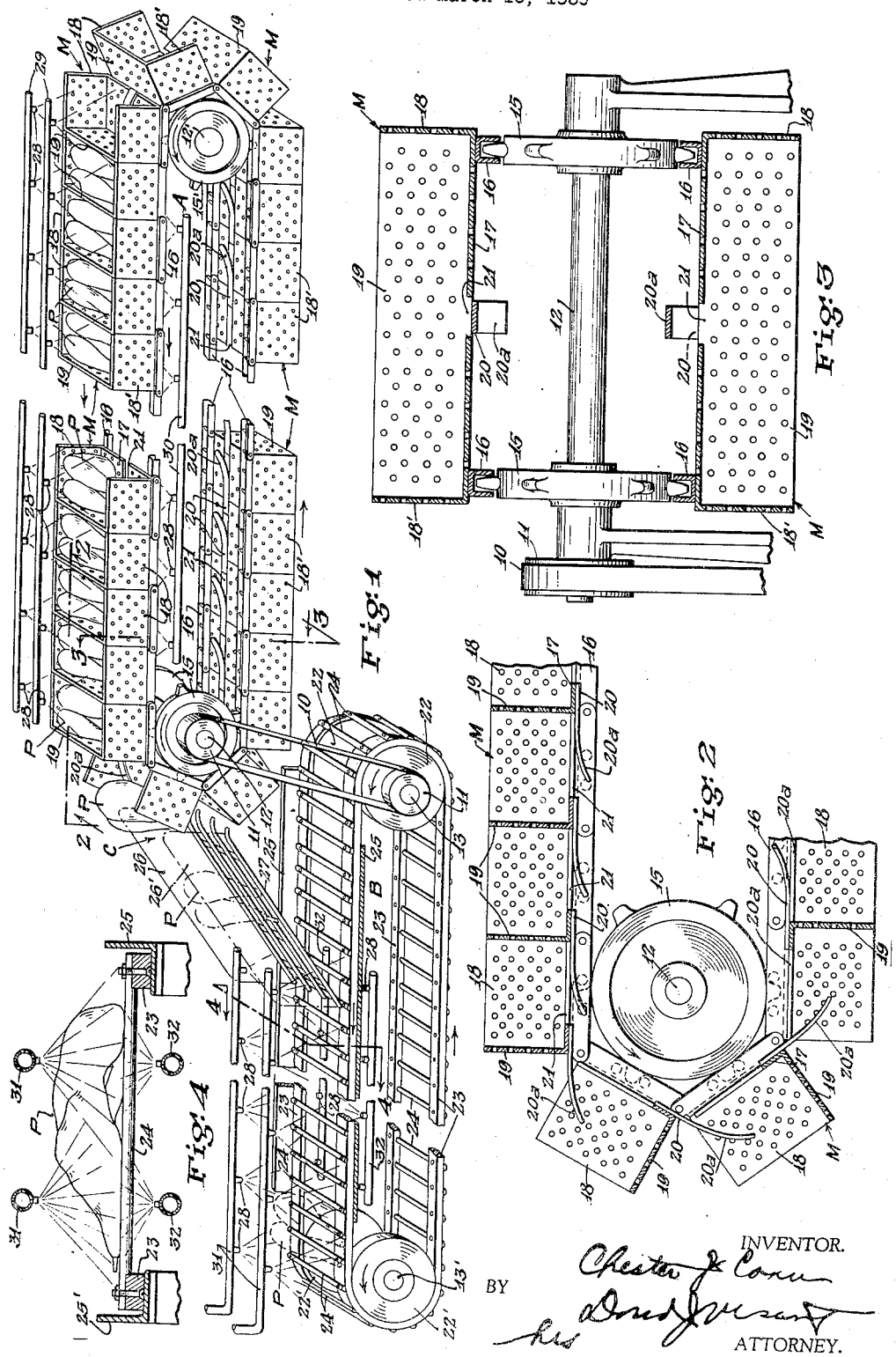

Patented Dec. 30, 1941

2,267,789

UNITED STATES PATENT OFFICE 2,267,789

APPARATUS FOR FREEZING FOOD PRODUCTS

Chester J. Conn, Smithtown Branch, N. Y.

Application March 15, 1939, Serial No. 261,918

6 Claims. (Cl. 62—104)

This invention relates to improvements in method of and apparatus for freezing deformable food products, being particularly directed to a system wherein the products are successively subjected to refrigerant in molds for partial or surface freezing and out of molds for full freezing.

Up to the present time, in the freezing of deformable food products, particularly poultry or the like, where the same are required to be molded or shaped, considerable difficulty has been encountered, particularly in conveyor, tunnel or cabinet freezing processes, by virtue of the fact that first, all the surfaces of a product carried in a mold for freezing are of necessity not contacted by the refrigerant due to the presence of the mold carrying the same, with the result that certain sections of the product are not as fully frozen as remaining sections, while others are subjected to the so-called "freezer burn"; on the other hand, as a result of freezing in molds, considerably more time is necessary to completely freeze the product, since the optimum condition of full surface contact of refrigerant on the product is not attainable, due to the presence of the molds.

Broadly, it is an object of this invention to provide a method and apparatus for freezing deformable food products, such as poultry or the like, wherein the same are shaped and maintained in molds during a preliminary freezing period, at which time these products are surface or partially frozen sufficient to maintain the molded shape and thereafter removed from the molds in self-supporting form to provide substantially entire surface contact with the refrigerant, for full freezing.

Specifically, it is an object of this invention to provide a method and apparatus for freezing deformable food products through the medium of a brine or other liquid spray, wherein the product, such as poultry or the like, is carried in the refrigerating zone successively within and out of molds, the product during the period it is carried in the molds being surface or partially frozen sufficient to maintain the required shape and thereafter removed from the mold in partially frozen state and in self-supporting form for complete freezing through contact of all its surfaces with the refrigerating medium.

Still further, it is an object of this invention to provide, in a system for refrigerating deformable food products or the like, wherein the products are successively transported on conveyors operating in synchronism within a refrigerating zone, the first of the conveyors providing molds, whereby the products set in the molds are partially or surface frozen in the required shape and the other of said conveyors being such as to permit access of refrigerant on all surfaces of the partially frozen product; the partially frozen product being discharged from one conveyor to the other within the refrigerating zone.

These and other advantages, capabilities and features of the invention will appear from the subjoined detailed description of one specific embodiment thereof illustrated in the accompanying drawing, in which Figure 1 is a perspective view of the apparatus forming the subject matter of my invention.

Figure 2 is an enlarged front elevation taken in section along lines 2—2 of Figure 1.

Figure 3 is an enlarged end elevation taken in section along lines 3—3 of Figure 1.

Figure 4 is an end elevation taken in section along lines 4—4 of Figure 1.

Referring to the reference characters in the drawing, A and B refer respectively to the endless conveyors, hereinafter designated as the "mold" and "freezing" conveyors, the same being in the preferred embodiment, as illustrated, mounted at different levels and having disposed therebetween connecting discharge chute C.

The respective conveyors A and B are driven from a common source of power (not shown), being connected for synchronous operation by belt 10 carried on and actuating pulleys 11—11' mounted on the respective drive shafts 12 and 13 of the conveyors.

The mold conveyor A is of the conventional parallel flexible link type actuated by sprocket wheel pairs 15—15' of which the drive sprocket wheels 15 are keyed to drive shaft 12 and idler sprocket wheels 15' are keyed to idler shaft 12'.

Across each of the respective pairs of opposing links 16 of mold conveyor A there are mounted mold units M, each consisting of an open top and open sided perforated metallic container, having a base 17, opposing ends 18—18' and one side 19, the respective molds M being positioned symmetrically with respect to the open side, so that the side of each following mold unit serves to provide an enclosing wall for the next preceding mold unit.

Along the base 17 of each mold section M there is mounted a tongue 20 extending substantially from midway of the base and projecting beyond the side 19 of the mold, the projecting portion of the tongue being slightly downwardly curved as at 20a. On the base 17 of each mold and in the same line as the tongue, but extending in the opposing direction, there is provided a cut-out groove or slot 21 of width and length to accommodate the projecting portion 20a of the tongue extending from the base of the next following mold unit, when two mold units are in adjacency when maintained in a parallel plane (see Figure 2).

The freezing conveyor B is of the conventional continuous belt type actuated by sprocket wheel pairs 22—22', of which drive sprocket wheels 22 are keyed to drive shaft 13 and idler sprocket wheels 22' are keyed to idler shaft 13'. Across the opposing continuous rubber belts 23 are carried spaced parallel rods 24, the belts being guided in their upper path along opposing angle bars 25—25'.

The chute C is comprised of opposing inclined guide rails 26—26' supporting an inclined base 27 formed of cross rods or slats; the chute being mounted at the delivery end of the mold conveyor having its upper reach at the delivery end of the mold conveyor and having its lower reach extending over the receiving end of the freezing conveyor.

The refrigerating medium, which may comprise of brine or other similar liquid, is applied in the form of a spray discharged from spaced orifices 28 mounted respectively on spaced parallel conduits 29 and 30 disposed above and below the upper levels of the mold conveyor and parallel conduits 31 and 32 disposed above and below the upper level of the freezing conveyor, so that the refrigerant may be sprayed in substantially all directions against the product being treated in the mold and freezing conveyors.

Referring particularly to Figures 1 and 2, wherein are disclosed in detail the structure and operative functions of the mold sections M applied in the mold conveyor A, it is noted that as the empty mold units pass around the idler sprocket wheels 15' at the charging section of the conveyor, the projection portion 20a of the tongue of a mold section is angularly directed towards and into the groove 21 in the base 17 of the next preceding mold unit, with the result that when adjacent mold sections are in parallelism, as shown in the top of Figure 1, side 19 of each mold section serves as a common side for and between adjacent mold sections and the projecting portion 20a of tongue 20 of each mold unit is disposed within the groove of the next preceding mold section, thereby forming a mold enclosure in which a deformable product, such as a fowl or the like, may be shaped and maintained in a predetermined form for treatment, as long as successive mold units are in the same plane.

As the mold conveyor M progresses in its movement in the direction of the arrow, the refrigerant in the form of spray acts on the mold and the product shaped therein, as for example, poultry disposed in the mold unit, whereby, when a particular mold unit attains the discharge end of the conveyor shown at the center of Figure 1, the product has been sufficiently subjected to refrigerant to surface harden and partially freeze the same, so that the product will at such time have sufficient rigidity to be self-maintaining in its shaped condition and contour.

As the mold units M are displaced at the discharge end of the mold conveyor the links 16 carrying the respective units are successively angularly displaced with the result that the tongue projection 20a of each successive unit is maintained in substantially horizontal plane as the base of the next preceding unit is displaced angularly to the horizontal plane, with the result that the molded product P which tends to follow the mold unit in which it is carried is restrained against such movement by virtue of the support given to the same by the projecting portion 20a of the tongue and as the next following mold unit carrying such tongue in its movement follows the angular displacement of the preceding mold unit, the tongue thereof acts to displace the product P down the incline (see center of Figure 1).

As the product P reaches the charging end of the freezing conveyor B (shown at the left of Figure 1) in its substantially rigid surface frozen shape or contour, it rests on the rods 24 (as shown in the dotted lines), and is subjected to the refrigerant sprays coming from above and below the upper level of the freezing conveyor, until at the time it attains the discharge end of the freezing conveyor it is fully frozen.

Although no specific showing has been made of the form of unit or chamber in which the mold and freezing conveyors A and B are mounted or maintained, it is within the province of this invention to apply the assembly in a freezing chamber as, for example, a tunnel or the like, or separate tunnels or cabinets may house the respective conveyors, which may be connected by a chute or connecting conveyor.

Further, although the respective conveyors have in the preferred embodiment illustrated been described as being mounted at different levels and connected by an inclined chute, it is within the province of this invention to vary the form and location of the respective conveyors and the connecting means therebetween, so long as there is provided a plurality of conveyors or conveyor sections, one of which provides mold units in which deformable products, such as poultry, may be partially or surface frozen to attain a predetermined shape or contour, and on the other of which there is provided a carrier or support for the thus shaped partially frozen product, so that the same as removed from the mold in self-supporting condition, may be maintained in the zone of a refrigerant to completely freeze the same under full surface contact by the refrigerant.

It is obvious that various changes and modifications may be made to the details of construction without departing from the general spirit of the invention as set forth in the appended claims.

I claim:

1. The method of treating deformable food products, which comprises shaping the deformable product in a mold, applying refrigerant to the shaped product sufficiently to surface freeze the same as shaped, into a contour of substantial firmness, removing the surface frozen product from the mold, and thereafter applying fluid refrigerant to contact substantially all the surfaces of the surface frozen product to completely freeze the same in its shaped contour.

2. In a method of freezing deformable products, which comprises subjecting the deformable food products to liquid spray refrigerant in two successive stages, the steps of shaping the product in a mold and retaining the same in the mold until it is sufficiently surface frozen by the liquid spray to independently maintain the shape imparted thereto, thereafter removing the thus-shaped partially frozen product from the mold and presenting the same for substantial full surface contact with the liquid spray refrigerant, for completely freezing the same.

3. In a method of freezing deformable products such as poultry or the like, which comprises maintaining the deformable products in a zone in which liquid refrigerating medium is discharged, the steps of disposing the product in a mold to impart a predetermined shape thereto and maintaining the same in the mold until it is partially frozen by the refrigerant sufficiently to independently maintain the shape imparted thereto in the mold, removing the partially frozen product from the mold and thereafter maintaining the same free of the mold within the refrigerating zone to present substantially its entire surface for contact with the liquid refrigerant until the same is completely frozen in its molded shape.

4. A method of treating deformable food products, wherein the same are conveyed through a freezing chamber in which refrigerant is directed against the same, which consists in shaping the food products in molds for maintenance in predetermined form for a period of time in the freezing chamber until a surface freeze is imparted thereto by contact of the refrigerant with the products and the molds containing the same sufficient for maintaining the shape thereof independent of the molds, thereafter discharging the partially frozen self-sustaining products from the molds and maintaining the same within the chamber in full surface contact with the refrigerant until the products are completely frozen in their molded contour.

5. A method of treating deformable food products, wherein the same are conveyed within a freezing chamber in which refrigerant is applied thereagainst, which consists in disposing the food products in molds for transport partially through the chamber, whereby a surface freeze is imparted to the products by the refrigerant contacting the products and the molds containing the same sufficient for maintaining the shape thereof independently of the molds, thereafter discharging the partially frozen self-maintaining products from the molds and transporting the same for the remainder of the distance of travel in the chamber in contact with the refrigerant on substantially all its surfaces, for completely freezing the products in the molded contour.

6. A method of freezing food products in a chamber supplied with refrigerant, which consists in conveying deformable food products in two stages through the chamber in which fluid refrigerant is discharged, the food products being maintained in molds during the first stage for surface freezing into self sustaining condition, and being released from the molds and conveyed as released free of the molds and in self sustaining condition for deep freezing during the second stage, the respective stages being continuous.

CHESTER J. CONN.